(12) United States Patent
Herbold et al.

(10) Patent No.: US 8,807,885 B2
(45) Date of Patent: Aug. 19, 2014

(54) METHOD AND APPARATUS FOR MACHINING A SHROUD BLOCK

(75) Inventors: John William Herbold, Fountain Inn, SC (US); Paul L. Kalmar, Zirconia, NC (US); Randall Stephen Corn, Travelers Rest, SC (US); James Bradford Holmes, Fountain Inn, SC (US)

(73) Assignee: General Electric Company, Schnectady, NY (US)

( * ) Notice: Subject to any disclaimer, the term of this patent is extended or adjusted under 35 U.S.C. 154(b) by 986 days.

(21) Appl. No.: 12/899,917

(22) Filed: Oct. 7, 2010

(65) Prior Publication Data

US 2012/0087752 A1   Apr. 12, 2012

(51) Int. Cl.
*B23B 35/00* (2006.01)
*B23B 41/00* (2006.01)
*B23Q 3/06* (2006.01)

(52) U.S. Cl.
CPC ........ *B23B 41/00* (2013.01); *B23Q 3/063* (2013.01); *B23B 35/00* (2013.01); *B23B 2215/76* (2013.01)
USPC ............................... 408/1 R; 408/87; 408/97

(58) Field of Classification Search
CPC ........ B23B 35/00; B23B 41/00; B23B 49/04; B23B 49/06; B23B 2215/76; B23Q 3/063
USPC ...... 408/1 R, 87, 89, 97, 98, 103, 108, 115 R, 408/706
See application file for complete search history.

(56) References Cited

U.S. PATENT DOCUMENTS

| | | | | |
|---|---|---|---|---|
| 1,493,521 A | * | 5/1924 | Corson et al. | 408/1 R |
| 1,556,855 A | * | 10/1925 | Lewis | 408/30 |
| 2,466,023 A | * | 4/1949 | Griffin | 408/79 |
| 3,464,314 A | * | 9/1969 | Gladwin | 409/145 |
| 4,406,069 A | * | 9/1983 | Clement | 33/642 |
| 5,253,425 A | * | 10/1993 | Wozniak | 33/373 |
| 6,126,389 A | * | 10/2000 | Burdgick | 415/115 |
| 7,117,983 B2 | * | 10/2006 | Good et al. | 188/380 |
| 2005/0091846 A1 | | 5/2005 | Powers et al. | |
| 2009/0053045 A1 | * | 2/2009 | Nowak et al. | 415/173.1 |
| 2009/0211091 A1 | | 8/2009 | Hlavaty et al. | |

FOREIGN PATENT DOCUMENTS

| | | | | |
|---|---|---|---|---|
| EP | 1338378 A2 | | 8/2003 | |
| FR | 2956598 A1 | | 8/2011 | |
| JP | 54128078 A | * | 10/1979 | B23Q 3/18 |
| RU | 2171733 C1 | * | 8/2001 | B23B 35/00 |

OTHER PUBLICATIONS

Search Report from EP Application No. 11183876.9 dated Nov. 29, 2013.

* cited by examiner

*Primary Examiner* — Daniel Howell
*Assistant Examiner* — Michael Vitale
(74) *Attorney, Agent, or Firm* — Dority & Manning, PA (57) ABSTRACT

A method and a machining kit for machining a bore hole into a shroud block are disclosed. The method includes designating a location of the bore hole on an exterior surface of the shroud block, positioning the shroud block in a machining device, securing the shroud block in the machining device, and machining the bore hole in the shroud block. The machining device includes a locating tool, a machining tool, a platform, a securing device, and a radial support. The radial support is configured to mate with a radial exterior surface of the shroud block such that a machining axis of the machining device may be aligned with a radial axis of the shroud block during positioning.

12 Claims, 5 Drawing Sheets

METHOD AND APPARATUS FOR MACHINING A SHROUD BLOCK

FIELD OF THE INVENTION

The present disclosure relates generally to turbine systems, and more particularly to methods and apparatus for machining bore holes in shroud blocks for turbine systems.

BACKGROUND OF THE INVENTION

Turbine systems are widely utilized in fields such as power generation. For example, a conventional gas turbine system includes a compressor, a combustor, and a turbine. In a conventional gas turbine system, compressed air is provided from the compressor to the combustor. The air entering the combustor is mixed with fuel and combusted. Hot gases of combustion flow from the combustor to the turbine to drive the gas turbine system and generate power.

Many components of a turbine system require machining before installation in the turbine system. One example of such a component is a shroud block. Many such shroud blocks are located in the turbine section of a turbine system. For example, a plurality of shroud blocks may be disposed in an annular array radially outward of the rotor blades and axially between the nozzles in a turbine system, forming shrouds surrounding the rotor blades and nozzles. Typically, shrouds are provided in each stage of the turbine section of the turbine system. In, for example, a gas turbine system, the shrouds may partially define the radial outer boundary of the hot gas path flowing therethrough.

Shroud blocks typically define a variety of bore holes therein, which generally serve a variety of purposes. For example, retaining pin holes may be provided to accept retaining pins therein. The retaining pins may serve to position and retain the shroud blocks within the turbine section. Other bore holes, such as cooling holes, may be provided to accept cooling medium therein, to cool the shroud blocks and/or other components of the turbine system. Further, bore holes such as borescope holes and/or probe holes may be provided for inspection purposes. These various bore holes must be machined into the shroud blocks at precise locations and angles, and with small tolerances, in order for the shroud blocks to be positioned correctly and function properly within the turbine section.

Typically, the process for machining the required bore holes into a shroud block on location and/or during a system outage is inaccurate and time-consuming. For example, the locations of the bore holes in the shroud are many times approximated based on the locations of mating bore holes or other components in the turbine section. After approximating the locations of the mating bore holes, the bore holes may be machined by placing the shroud block on a flat, planer surface, such as on the platform of a drill-press, and machining the bore holes at the approximated locations on the shroud block. Because the shroud blocks include various radial outer surfaces, the placement of these outer surfaces on planer surfaces for machining may cause the bore holes to be machined at inaccurate angles. The combination of approximated location and inaccurate angle may result in bore holes that, for example, cannot be mounted properly in the turbine section and/or allow leakage from the shroud or into the shroud.

Further, the current inaccurate processes for machining the require bore holes may require the shroud blocks to be repeatedly machined to modify the bore holes until they perform adequately. This repeated machining for each shroud block is time-consuming and inefficient, and increases the time during which the turbine system is shut down, resulting in increased losses in the performance and revenue generated from the system.

Thus, an improved method and apparatus for machining a shroud block would be desired in the art. For example, a method and apparatus that allow for accurate and efficient machining of bore holes into shroud blocks would be advantageous.

BRIEF DESCRIPTION OF THE INVENTION

Aspects and advantages of the invention will be set forth in part in the following description, or may be obvious from the description, or may be learned through practice of the invention.

In one embodiment, a method for machining a bore hole into a shroud block is disclosed. The method includes designating a location of the bore hole on an exterior surface of the shroud block, positioning the shroud block in a machining device, securing the shroud block in the machining device, and machining the bore hole in the shroud block. The machining device includes a locating tool, a machining tool, a platform, a securing device, and a radial support. The radial support is configured to mate with a radial exterior surface of the shroud block such that a machining axis of the machining device may be aligned with a radial axis of the shroud block during positioning.

In another embodiment, a machining kit for machining a bore hole in a shroud block is disclosed. The machining kit includes a designation device configured to designate a location of the bore hole on an exterior surface of the shroud block. The machining kit further includes a machining device. The machining device includes a platform, a securing device, a radial support, a locating tool, and a machining tool. The radial support is configured to mate with a radial exterior surface of the shroud block such that a machining axis of the machining device may be aligned with a radial axis of the shroud block. The locating tool is provided for interacting with the location of the bore hole. The machining tool is provided for machining the bore hole in the shroud block.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
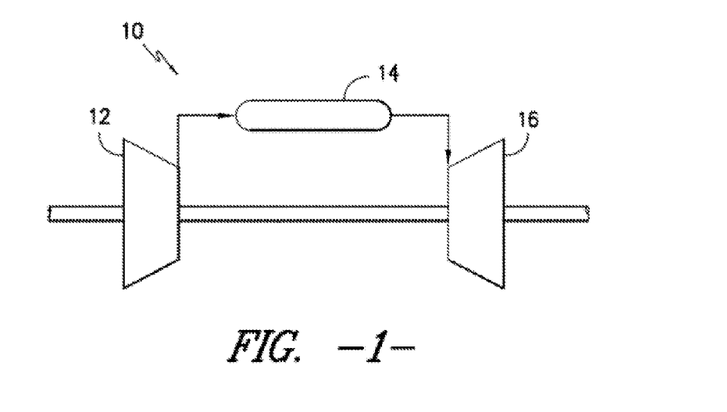
FIG. 1 is a schematic view of one embodiment of a turbine system according to the present disclosure.

Referring to FIG. 1, a schematic view of a turbine system 10 is illustrated. The turbine system 10 as shown in FIG. 1 is a gas turbine system. Thus, the system 10 comprises a compressor section 12 for pressurizing a gas, such as air, flowing into the system 10. It should be understood that while the gas may be referred to herein as air, the gas may be any gas suitable for use in a gas turbine system 10. Pressurized air discharged from the compressor section 12 flows into a combustor section 14, which is generally characterized by a plurality of combustors disposed in an annular array about an axis of the system 10. The air entering the combustor section 14 is mixed with fuel and combusted. Hot gases of combustion flow from the combustor section 14 to a turbine section 16 to drive the system 10 and generate power. It should be understood, however, that the turbine system 10 of the present disclosure is not limited to gas turbine systems, and that any suitable turbine system is within the scope and spirit of the present disclosure.

The turbine system 10 may include a shroud (not shown), or a plurality of shrouds, therein. For example, the shrouds may be included in the turbine section 16 or in any other suitable section or location in the turbine system 10. Each shroud may be generally annular, and may comprise a plurality of shroud blocks 22 disposed in an annular array to form the shroud. The shroud according to the present disclosure may be located in any suitable position in the turbine system 10. For example, in the turbine section 16 of the turbine system 10, the shroud may be associated with the stage one rotor blades and/or nozzles, the stage two rotor blades and/or nozzles, or the stage three rotor blades and/or nozzles. Alternatively, the shroud may be associated with any suitable stage or location in the turbine section 16 or other section or location in the turbine system 10.

Figure 2:
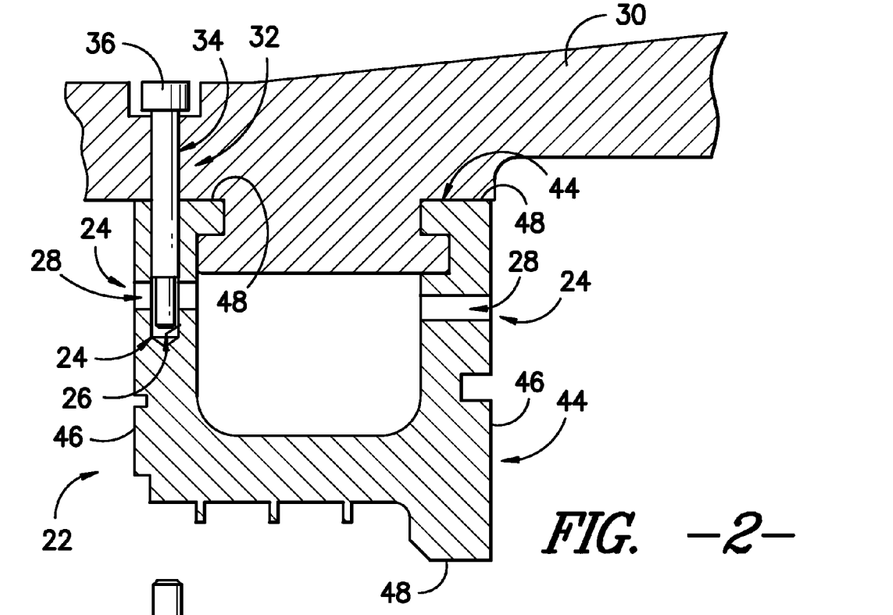
FIG. 2 is a sectional view of a turbine casing and a shroud block having various bore holes according to one embodiment of the present disclosure.
Figure 3:
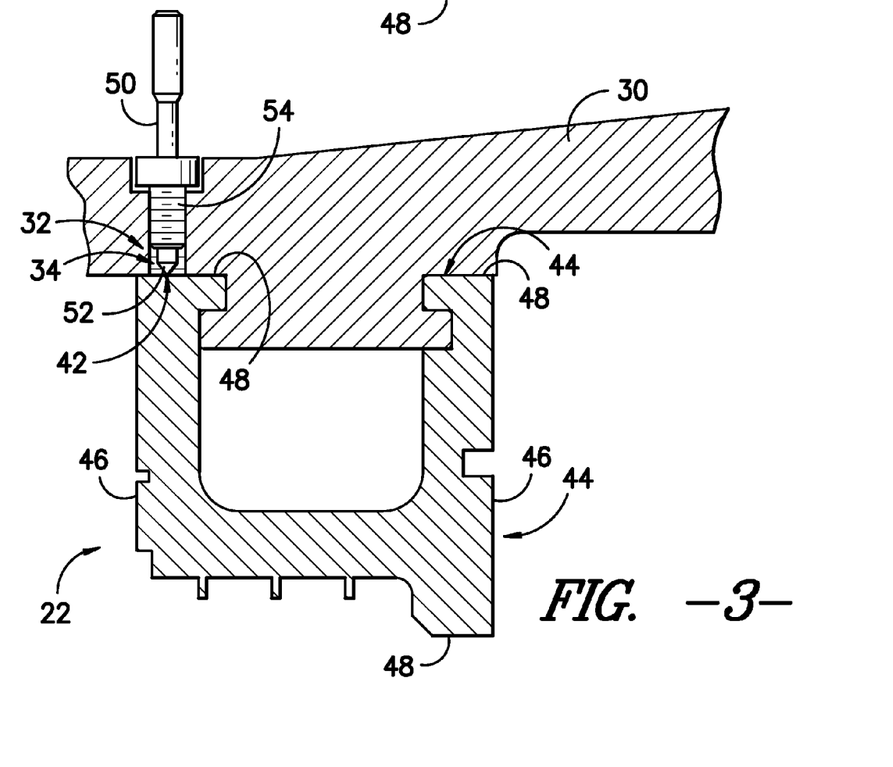
FIG. 3 is a sectional view of a turbine casing and a shroud block without the various bore holes machined therein, as well as various components of a machining kit, according to one embodiment of the present disclosure.
Figure 4:
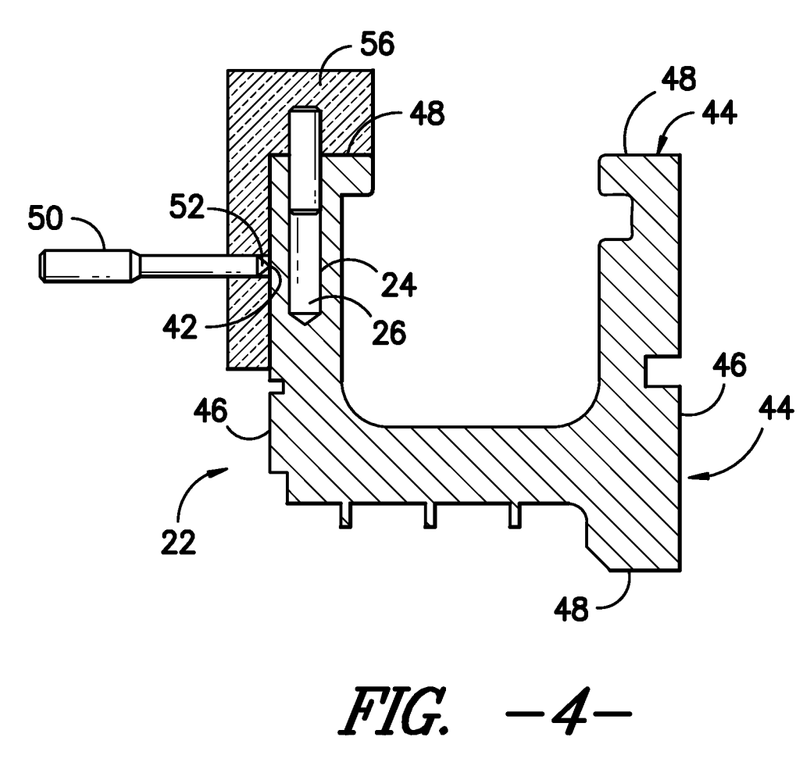
FIG. 4 is a perspective view of a shroud block with various bore holes machined therein, as well as various components of a machining kit, according to one embodiment of the present disclosure.

Referring now to FIGS. 2 through 4, the shroud block 22 of the present disclosure may define a variety of bore holes therein. These various bore holes 24 may perform a variety of functions. For example, the bore holes 24 may be retaining holes 26. The retaining holes 26 may serve to position and retain the shroud block 22 within the turbine section 16, as discussed below. Additionally or alternatively, the bore holes 24 may be cooling holes 28, which may be provided to flow cooling medium through the shroud block 22. Additionally, or alternatively, the bore holes 24 may be borescope holes (not shown) and/or probe holes (not shown) provided for inspection purposes, or the bore holes 24 may be any other suitable bore holes.

The shroud blocks 22 may be mounted and positioned with respect to other components of the turbine section 16. For example, as shown in FIGS. 2 and 3, the shroud blocks 22 may be mounted to an outer turbine casing 30. It should be understood, however, that the present disclosure is not limited to shroud blocks 22 mounted to turbine casings 30, and that shroud blocks 22 mounted to any suitable component of a turbine system 10 are within the scope and spirit of the present disclosure. The turbine casing 30 or other suitable component may define a variety of mating bore holes 32, which may be sized and configured to mate with the bore holes 24 defined in the shroud blocks 22. For example, as shown, the turbine casing 30 may include retaining holes 34. The retaining holes 26 in the shroud block 22 may be defined in the shroud block 22 to mate with the retaining holes 34 in the turbine casing 30, and a retaining pin 36 may be placed through the retaining holes 26 and 34 to position and retain the shroud block 22 in the turbine casing 30. For example, the retaining holes 26 and 34 and the retaining pin 36 may serve to position the shroud block 22 circumferentially with respect to the turbine casing 30 and other shroud blocks 22 in the shroud.

The turbine casing 30 and/or other components in the turbine section 14, such as other shroud blocks 22, may further include other bore holes 32, such as cooling holes, borescope holes, and/or probe holes, which may similarly mate with the respective holes defined in the shroud blocks 22. The proper mating of the bore holes 24 in the shroud blocks 22 with the various respective bore holes 32 in the turbine casing 30 and/or other components is crucial to the efficient and reliable performance of the turbine system 10. As such, the bore holes 24 defined in the shroud block 22 must be accurately formed with regard to location and orientation in the shroud block 22.

Thus, the present disclosure is directed to a machining kit 40 for machining a bore hole 24 in a shroud block 22, and to a process for machining a bore hole 24 in a shroud block 22. The present machining kit 40 and process may advantageously provide for accurate and efficient machining of bore holes 24 in shroud blocks 22. For example, the present machining kit 40 and process may ensure that the locations 42 of the bore holes 24 on the exterior surfaces of the shroud blocks 22 are accurately designated, and may further ensure that the bore holes 24 are accurately oriented in the shroud blocks 22. Advantageously, the present machining kit 40 and process, discussed below, may further specifically provide for accurate and efficient machining of bore holes 24 in shroud blocks 22 on location at the sites of systems 10 and/or during system 10 outages. For example, in exemplary embodiments, the machining kit 40 may be designed to be portable into the field to the location of a system 10. The various components of the machining kit 40 may allow for accurate and efficient machining on location and/or during outages, without requiring the shroud blocks 22 to be shipped off-location and thus delaying the machining process and/or extending the outage time of the system 10.

The shroud block 22 according to the present disclosure, before the bore holes 24 are machined therein, may be initially manufactured to a desired shape and size. Thus, the shroud block 22 may include a variety of exterior surfaces 44. While various of these exterior surfaces 44 may be planer exterior surfaces 46, other exterior surface 44 may be radial exterior surfaces 48. The radial exterior surfaces 48 may generally have a radial contour such that the adjacent radial exterior surfaces 48 of adjacent shroud blocks 22 in a shroud may form an annular surface.

In some embodiments, after manufacturing of the shroud block 22, the shroud block 22 may be initially aligned in the turbine system 10, as shown in FIG. 3. For example, in embodiments wherein the shroud blocks 22 are mounted to the turbine casing 30, the shroud blocks 22 may be initially mounted to the turbine casing 30 to determine the proper alignment and positioning of the shroud blocks 22.

As shown in FIGS. 3 and 4, the machining kit of the present disclosure 40 generally includes a designation device 50. The designation device 50 may, in some embodiments, be a center punch. Alternatively, the designation device 50 may be any suitable rod, light locating device or laser locating device (such as a precision laser beam), or other suitable tool for designating a location 42 of a bore hole 24, as discussed below. In some embodiments, the designation device 50 may have a replaceable tip 52. The replaceable tip 52 may be made from a material that is the same as or different from the remainder of the designation device 50. Thus, the replaceable tip 52 may have different properties than the designation device 50, such as a different hardness. The replaceable tip 52 may be replaceable after, for example, the tip 52 is worn from continued usage and is no longer performing accurately.

The designation device 50 may be configured to designate a location 42 of the bore hole 24 on an exterior surface 44 of the shroud block 22. For example, the designation device 50 may be configured to locate the location 42 of the bore hole 24 on an exterior surface 44 of the shroud block 22. To locate the location 42 according to some embodiments, the designation device 50 may be placed through a mating bore hole in a mating turbine component such that the designation device 50 interacts with an exterior surface 44 of the shroud block 22. For example, according to one embodiment as shown in FIG. 3, the designation device 50 may be placed through a bore hole 32, such as a retaining hole 34, in the turbine casing 30. The designation device 50 may, having passed through the bore hole 32, interact with exterior surface 44 of the shroud block 22 at the location 42 of a mating bore hole 24 to be machined in the shroud block, such as retaining hole 26. The designation device 50 may interact with the exterior surface 44 by, for example, touching or otherwise contacting the exterior surface 44.

In one embodiment, the designation device 50 may have an outer perimeter approximately equal to the inner perimeter of the mating bore hole in the mating turbine component. Thus, the outer surface of the designation device 50 may interact with the inner surface of the mating bore hole, aligning the designation device 50 within the mating bore hole. This may ensure that the designation device 50 accurately locates the location 42 of the bore hole 24 on the exterior surface 44 of the shroud block 22 with respect to the mating bore hole.

In another embodiment, the machining kit 40 may further include an adapter 54. The adapter 54 may be provided to interact with the mating bore hole in the mating turbine component, and with the designation device 50, to locate the location 42 of the bore hole 24 on the exterior surface 44 of the shroud block 22. For example, the adapter 54 may have an exterior perimeter approximately equal to the inner perimeter of the mating bore hole in the mating turbine component. Additionally or alternatively, the adapter 54 may have outer threads configured to mate with inner threads of the mating bore hole, or may include other various features configured to mate with mating features of the mating bore hole. Further, the designation device 50 may having an outer perimeter approximately equal to the inner perimeter of the adapter 54. The adapter 54 may be introduced to the mating bore hole, and the designation device 50 may be placed through the adapter 54 such that the designation device 50 interacts with the exterior surface 44 of the shroud block 22. This may ensure that the designation device 50 accurately locates the location 42 of the bore hole 24 on the exterior surface 44 of the shroud block 22 with respect to the mating bore hole.

In some embodiments, the designation device 50 may further be configured to mark the location 42 of the bore hole 24 on the exterior surface 44 of the shroud block 22. For example, the designation device 50 may include a tip, such as replaceable tip 52, a permanent tip, or another suitable marking device. Once the location 42 of the bore hole 24 has been located on the exterior surface 44 of the shroud block 22, the designation device 50 may mark the location 42 of the bore hole 24 on the exterior surface 44 of the shroud block 22. In one embodiment wherein the designation device 50 is a center punch having a tip, for example, a device such as a hammer may be utilized to punch the exterior surface 44 of the shroud block 22, thus marking the location 42 of the bore hole 24.

Additionally or alternatively, a separate device may be utilized to mark the location 42 of the bore hole 24. For example, a marker, such as a pen or pencil, a separate punching device, or another suitable marking device, may be utilized to mark the location 42 of the bore hole 24 on the exterior surface 44 of the shroud block 22 after the designation device 50 locates the location 42 and/or marks the location 42.

To locate the location 42 according to some alternative embodiments, as shown in FIG. 4, the machining kit 40 of the present disclosure may further include a locating jig 56. The locating jig 56 may be configured to locate the location 42 of the bore hole 24 on the exterior surface 44 of the shroud block 22 with respect to an existing bore hole 24 in the shroud block 22. For example, in one embodiment, the shroud block 22 may include a retaining hole 26, and the locating jig 56 may be configured to locate the location 42 of a cooling hole 28 on the exterior surface 44 of the shroud block 22 with respect to the retaining hole 26. The locating jig 56 may include, for example, a protrusion having an exterior perimeter approximately equal to the inner perimeter of the existing bore hole 24. The locating jig 56 may further include various features for aligning the locating jig 56 on the shroud block 22, such as panels and/or protrusions that interact with the various exteriors surfaces 44 of the shroud block 22. The locating jig 56 may be introduced to the existing bore hole 24 in the shroud block 22 and aligned with respect to the shroud block 22, such that the locating jig 56 locates the location 42 of the bore hole 24 on the exterior surface 44 of the shroud block 22. In some embodiments, the locating jig 56 may further be configured to mark the location 42, including various features for marking as discussed above. Additionally or alternatively, a separate device may be utilized to mark the location 42 of the bore hole 24, as discussed above.

Figure 5:
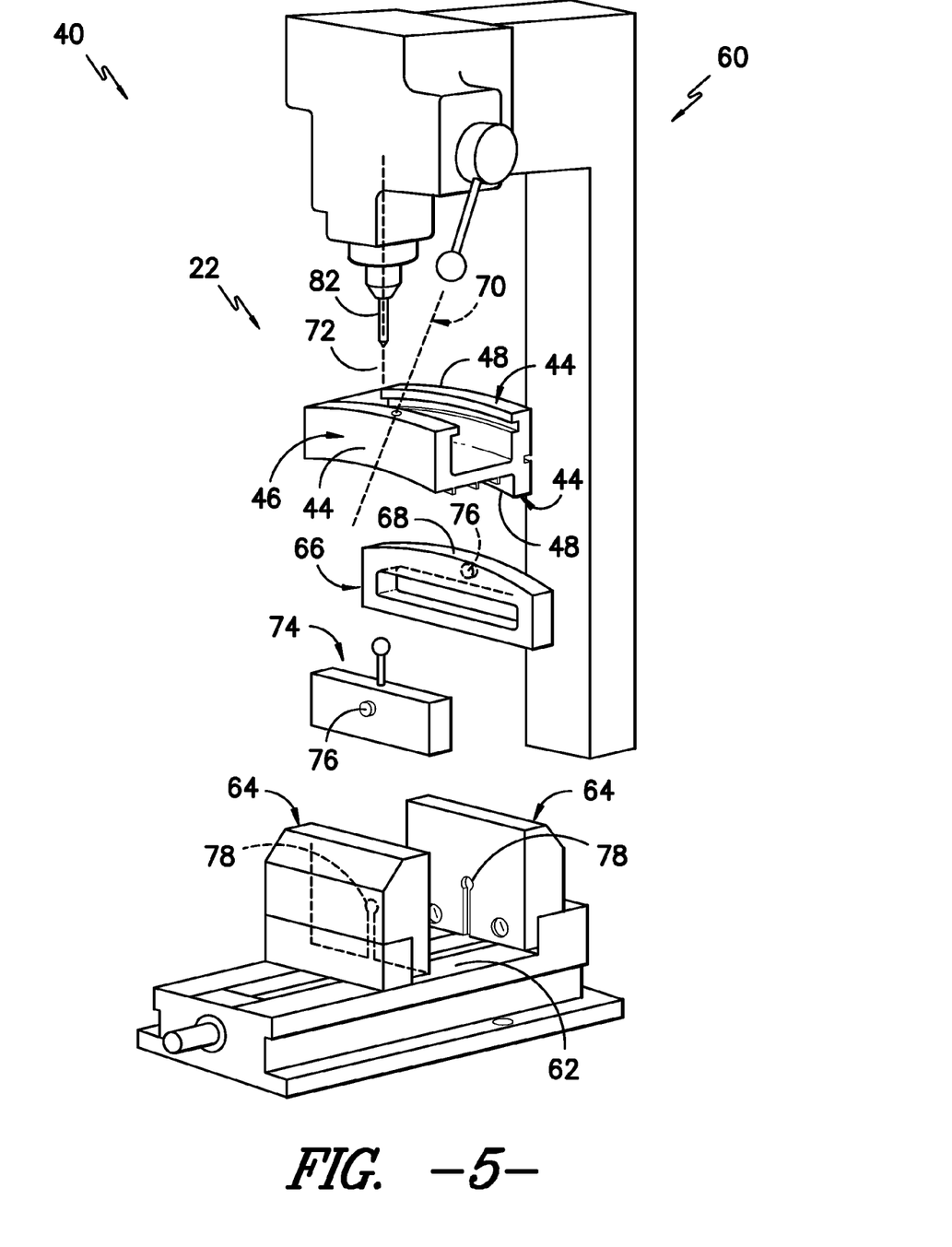
FIG. 5 is an exploded perspective view of a machining device according to one embodiment of the present disclosure.
Figure 6:
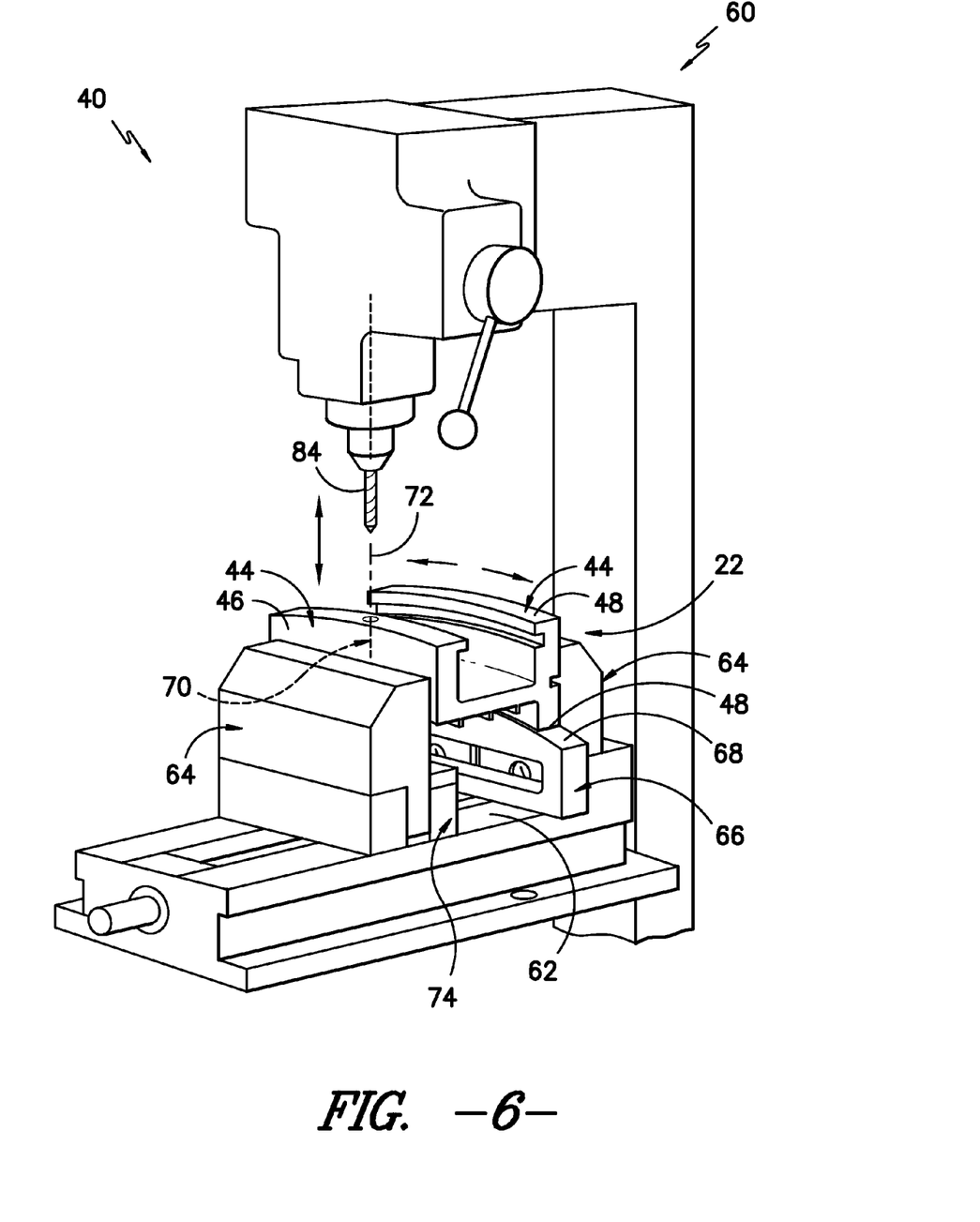
FIG. 6 is an assembled perspective view of a machining device according to one embodiment of the present disclosure.

As shown in FIGS. 5 and 6, the machining kit 40 of the present disclosure may further include a machining device 60. In general, the machining device 60 may be configured to machine bore holes 24 into the shroud block 22. For example, in some embodiments, the machining device 60 may be a mill press. In other embodiments, the machining device 60 may be a drill press. It should be understood, however, that the machining device 60 is not limited to mill presses and drill presses, but rather that any suitable device for machining a bore hole 24 into a shroud block 22 is within the scope and spirit of the present disclosure. As discussed below, the machining device 60 of the present disclosure includes various novel components for accurately and efficiently machining bore holes 24 into shroud blocks 22.

For example, the machining device 60 may include a platform 62. In general, the platform 62 may be any suitable surface on which to place various other components of the machining device 60, and on which to place the shroud block 22 for machining. In some embodiments, the platform 62 has a generally planer work surface. In other embodiments, the platform 62 may have any suitably contoured work surface or surfaces.

The machining device 60 may further include a securing device 64. The securing device 64 may be configured to secure the shroud block 22, as well as various supports for the shroud block 22 as discussed below, for machining. For example, the securing device 64 may be any suitable clamp or vice device, or any other suitable securing device. To secure the shroud block 22, the securing device 64 may, after being brought into communication with the shroud block 22, be tightened about the shroud block 22 to hold the shroud block 22 in a generally stationary position.

The machining device 60 may further include a radial support 66, or a plurality of radial supports 66. The radial supports 66 may be configured to mate with radial exterior surfaces 48 of the shroud block 22. For example, as shown in FIGS. 5 and 6, a radial support 66 according to the present disclosure has an exterior surface 68 with a radial contour. The radial contour of the exterior surface 68 may generally match the radial contour of a radial exterior surface 48 of the shroud block 22. Further, the radial exterior surface 68 of the radial support 66 may have various protrusions and indentations to mate with the various indentations and protrusions of the radial exterior surface 48 of the shroud block 22. Thus, when the radial exterior surface 48 of the shroud block 22 is placed in communication with the radial exterior surface 68 of the radial support 66, the surfaces may mate together. It should be understood that the radial supports 64 may be independent of the platform 62 and securing device 64, or may be incorporated into the platform 62 and/or securing device 64. For example, the platform 62 may have a radial surface, which may be considered a radial support 66, and/or the securing device 64 may have a radial surface or surfaces, which may be considered a radial support 66.

As discussed above, the various shroud blocks 22 in a shroud may be configured so that they may be disposed in an annular array within the turbine system 10. Thus, a radial axis 70 may be defined through the shroud block 22 according to the present disclosure at the location 42 of a bore hole 24, as shown in FIGS. 5 and 6. The radial axis 70 is an axis extending from the radial center of the shroud through the shroud block 22 when the shroud block is disposed in an annular array in the shroud. Thus, when machining a bore hole 24 in a shroud block 22, it is generally vital to the performance of the turbine system 10, and to the machining process, that the bore hole 24 be machined along this radial axis 70. As further shown in FIGS. 5 and 6, the machining device 60 may generally have a machining axis 72. The machining axis 72 is an axis along which the machining device 60 operates. Thus, in order for the bore hole 24 to be machined accurately along the radial axis 70, the radial axis 70 and the machining axis 72 must be aligned.

Thus, the radial supports 66 according to the present disclosure may be provided to mate with radial exterior surfaces 48 of the shroud block 22 such that the machining axis 72 may be aligned with the radial axis 70 of the shroud block 22. For example, the radial supports 66, after mating with the shroud blocks 22, may allow the shroud blocks 22 to be adjusted such that the location 42 of the bore hole 24 is aligned with the machining axis 72 while further causing the shroud block 22 to rotate about the radial axis 70, thus allowing the radial axis 70 and the machining axis 72 to be aligned through the location 42, as shown in FIG. 6. The radial supports 66 thus allow the bore holes 24 to be machined in the shroud blocks 22 accurately and efficiently.

In some embodiments, the machining device 60 may further include a supplementary support 74 or a plurality of supplementary supports 74. The supplementary supports 74 may have contoured surfaces, which may be similar to the surfaces of the radial supports 66 or may be configured to mate with other various surfaces of the shroud block 22. The supplementary supports 74 may be provided in the machining device 60 to provide additional support to the shroud block 22 while allowing the shroud block 22 to rotate about the radial axis 70, as discussed above.

In some embodiments, the securing device 64, the radial supports 66, and the supplementary supports 74 may include mating male locking components 76 and female locking components 78 for locking the securing device 64 together with the radial supports 66 and/or supplementary supports 74. For example, the securing device 64 may include one of a male locking component 76 or a female locking component 78, and the radial supports 66 and/or supplementary supports 74 may include the other of a male locking component 76 or a female locking component 78. The male and female locking components 76, 78 may be, for example, keys and keyholes, respectively, or any other suitable protrusions and indentions. The male and female locking components 76, 78 may allow the radial supports 66 and, if required, the supplementary supports 74, to be locked together with the securing device 64. This may allow for accurate and efficient machining of the bore hole 24 in the shroud block 22.

The machining device 60 of the present disclosure may further include a locating tool 82 (see FIG. 5) and a machining tool 84 (see FIG. 6). The locating tool 82 may be provided for interacting with the location 42 of the bore hole 24, such that the location 42 may be detected for accurate machining of the bore hole 24. The locating tool 82 may be, for example, a drill bit, a rod, a light locating device or laser locating device (such as a precision laser beam), or any other suitable device for interacting with the location 42. During positioning of the shroud block 22 in the machining device 60, the locating tool 82 may be put into operation in the machining device 60. When put into operation, the locating tool 82 may travel along the machining axis 72. Thus, to detect the location 42 of the bore hole 24, the shroud block 22 may be shifted circumferentially about the radial support 66, as discussed above, until the locating tool 82 may, when traveling along the machining axis 72, interact with the location 42 of the bore hole 24. When the shroud block 22 is positioned such that the location 42 is on the machining axis 72, such that the locating tool 82 may travel along the machining axis 72 and interact with the location 42 by contacting it, the location 42 is detected for accurate machining of the bore hole 24.

The machining tool 84 may be provided for machining the bore hole 24 in the shroud block 22. For example, the machining tool 84 may be a drill bit, an end mill, or any suitable machining tool for machining a bore hole. For machining of the bore hole 24 into the shroud block 22, the machining tool 84 may be put into operation in the machining device 60. When put into operation, the machining tool 84 may travel along the machining axis 72. To machine the bore hole 24, the machining tool 84 may be operated and moved along the machining axis 72, contacting the shroud block 22 at the location 42 and forming the bore hole 22 therein.

As discussed above, the present disclosure is further directed to a method for machining a bore hole 24 into a shroud block 22. The method may include, for example, designating a location 42 of the bore hole 24 on an exterior surface 44 of the shroud block 22. For example, the designating step may include locating the location 42 of the bore hole 24 on the exterior surface 44 of the shroud block 22 and marking the location 42 of the bore hole 24 on the exterior surface 44 of the shroud block 22.

As discussed above, the locating step may include, for example, placing a designation device 50 through a mating bore hole in a mating turbine component such that the designation device 50 interacts with the exterior surface 44 of the shroud block 22. Alternatively, the locating step may include introducing an adapter 54 to the mating bore hole and placing a designation device 50 through the adapter 54 such that the designation device 50 interacts with the exterior surface 44 of the shroud block 22. Additionally or alternatively, the locating step may include introducing a locating jig 56 to an existing bore hole 24 in the shroud block 22.

The present method may further include positioning the shroud block 22 in the machining device 60. For example, in some embodiments, the positioning step may include mating the radial exterior surface 48 and the radial support 66, as discussed above. Additionally or alternatively, the positioning step may include detecting the location 42 of the bore hole 24, as discussed above. For example, in some embodiments, the detecting step may include shifting the shroud block 22 circumferentially about the radial support 66 until the locating tool 82 may interact with the location 42 of the bore hole 24.

In some embodiments, the positioning step may further include leveling the shroud block 22. For example, in some embodiments, various components of the machining device 60, such as the platform 62, may not be initially level along one or more axes. During positioning, the shroud block 22, after being placed in the machining device 60, may be leveled as required using any suitable locating and/or leveling devices.

Further, in some embodiments the present method may include calibrating the machining device 60. For example, in one embodiment, the calibrating step may include leveling the machining device 60. For example, the machining device 60 may be leveled along any axis, as required, using any suitable locating and/or leveling devices. Additionally or alternatively, the calibrating step may include aligning the machining axis 72 with respect to the platform 62. For example, the machining axis 72 according to some embodiments may desirably be generally perpendicular to the surface of the platform 62. Thus, any suitable locating and/or leveling devices may be utilized to align the machining axis 72 with respect to the platform 62 as desired.

The present method may further include, for example, securing the shroud block 22 in the machining device 60, as discussed above. Finally, the present method may further include machining the bore hole 24 in the shroud block 22, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for machining a bore hole into a shroud block, the method comprising:
    designating a location of the bore hole on an exterior surface of the shroud block, wherein the designating step comprises locating the location of the bore hole on the exterior surface of the shroud block by placing a designation device through a mating bore hole in one of a mating turbine component or a locating jig such that the designation device interacts with the exterior surface of the shroud block, and wherein the designating step further comprises marking the location of the bore hole on the exterior surface of the shroud block;
    positioning the shroud block in a machining device, the machining device comprising a locating tool, a machining tool, a platform, a securing device, and a radial support, the radial support configured to mate with a radial exterior surface of the shroud block such that a machining axis of the machining device may be aligned with a radial axis of the shroud block during positioning;
    securing the shroud block in the machining device; and,
    machining the bore hole in the shroud block.

2. The method of claim 1, the positioning step comprising mating the radial exterior surface and the radial support.

3. The method of claim 1, the positioning step comprising detecting the location of the bore hole.

4. The method of claim 3, the detecting step comprising shifting the shroud block circumferentially about the radial support until the locating tool may interact with the location of the bore hole.

5. The method of claim 1, the positioning step comprising leveling the shroud block.

6. The method of claim 1, wherein the designation device has an outer perimeter approximately equal to the inner perimeter of the mating bore hole.

7. The method of claim 1, wherein the locating step further comprises introducing an adapter to the mating bore hole and placing the designation device through the adapter such that the designation device interacts with the exterior surface of the shroud block, the designation device having an outer perimeter approximately equal to the inner perimeter of the adapter.

8. The method of claim 1, wherein the locating step comprises introducing a locating jig to an existing bore hole in the shroud block, the locating jig configured to locate the location of the bore hole.

9. The method of claim 1, further comprising calibrating the machining device.

10. The method of claim 9, wherein the calibrating step comprises leveling the machining device.

11. The method of claim 9, wherein the calibrating step comprises aligning the machining axis with respect to the platform.

12. The method of claim 1, wherein the one of the mating turbine component or the locating jig is the mating turbine component.

* * * * *